June 3, 1924.
T. B. HOMAN
COMPUTER FOR PSYCHOLOGICAL DATA
Filed Oct. 13, 1922
1,496,088
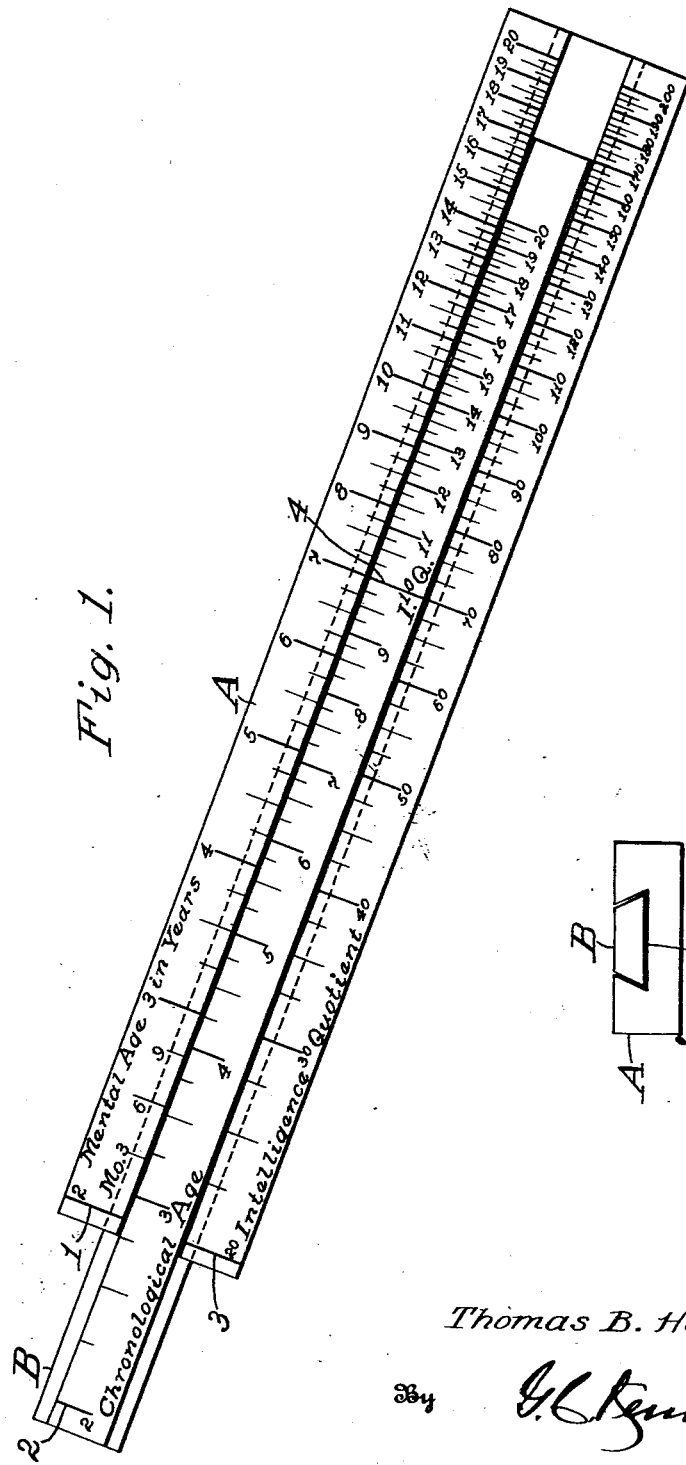
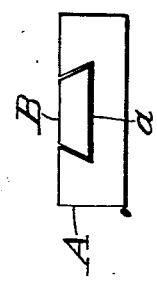
Inventor
Thomas B. Homan,
By G. C. Kennedy.
Attorney Patented June 3, 1924.

1,496,088

UNITED STATES PATENT OFFICE.

THOMAS B. HOMAN, OF CEDAR FALLS, IOWA.

COMPUTER FOR PSYCHOLOGICAL DATA.

Application filed October 13, 1922. Serial No. 594,326.

*To all whom it may concern:*

Be it known that I, THOMAS B. HOMAN, a citizen of the United States of America, and a resident of Cedar Falls, Blackhawk County, Iowa, have invented certain new and useful Improvements in Computers for Psychological Data, of which the following is a specification.

My invention relates to improvements in computers, and specifically to computers for use in psychological tests, and the object of my improvement is to provide a device which can be adjusted to determine an intelligence quotient after a summarized total of tests has been arrived at.

This object I have accomplished by the means which are hereinafter described and claimed, and which are illustrated in the accompanying drawings, in which Fig. 1 is a plan of my improved device, and Fig. 2 is an end elevation thereof.

In order to properly determine the relative mentality of an individual in comparison with a normal one, the individual under examination submits to psychological tests of any suitable kind whose results are compared and combined, then summarized in a total value expressing the mental age in years, the nature of the particular tests being subject to variation according to the individual and not being important specifically as relates to this invention.

The chronological age of the individual is then compared with this mental age total, by the use of the adjustable cooperating scales of my device, to indicate on one scale thereof a total which expresses said relative mentality.

My device is simple, and easily operated. It comprises an elongated body or rule A, having a longitudinal trench or slideway $a$ which is rabbeted at opposite interior angles acutely to receive a slidable elongated body B to prevent displacement of the latter in other than a longitudinal direction.

The upper surfaces of the bodies A and B are in the same plane. These surfaces the bodies A and B are transversely graduated with like scales 1, 2 and 3, both the major and minor sub-divisions of each progressively diminishing. The graduations on the scales 1 and 3 of the spaced top parts of the body A are transversely alined with each other, but these graduations have different numeral denominations and the fact that the graduations on the scales 1 and 3 are transversely alined has no significance as compared with each other without the relative use of the sliding scale 2. Thus, the scale 1 shows in its graduation, mental ages in years in the major sub-divisions and quarters of years in the minor sub-divisions, beginning with the year 2 and ending with the year 20, but of course this system may be extended if desired. The scale 3, which denotes in its graduations, different intelligence quotients by tens from twenty to two hundred, these series of tens, in the major graduations being directly opposite the year graduations on the scale 1 and progressively diminishing, the intermediate slidable scale 2 may be adjusted longitudinally relative to the scales 1 and 3 to indicate an intelligence quotient on the scale 3 which follows from the relative positions of certain graduations upon the scales 1 and 2.

The different psychological tests of the subject having been made, summarized, and the total obtained denoting the mental age in years of the subject, the chronological age in years of the subject being known, the sliding scale 2 should be moved longitudinally in the slideway A to place the chronological age, or rather the transverse line which denotes it, in alinement with that graduation on the fixed scale 1 which denotes the mental age in years or fractions thereof of the subject as experimentally determined by the psychological tests. As both of the scales 2 and 3 are of a decimal character, the arbitrarily selected graduation 10 on the sliding scale 2, indicating an average of the chronological ages on the scale 2, which is also denominated and shown by means of a coincident transverse index mark 4, when the particular mark on the scale 2 is found which indicates the chronological age and is alined with the graduation on the scale 1 which indicates the mental age, will be alined with a graduation or some part of the space between graduations on said scale 3. The graduation thus found upon the scale 3 will have the approximate numeral of the intelligence quotient of the subject.

For instance, as shown in Fig. 1, when the graduation for 5 years on the scale 2 is alined with the graduation for 3½ years on the scale 1, the index line 4 will be alined with and will indicate the numeral 70 upon the scale 3 which will show that the subject has an approximate mental efficiency of 70% on the scale 3 where the numeral 100 denotes the norm. That is, the subject being 5 years old and having a mental age of 3½ years, this intelligence quotient is found to be 70% of the normal. In this way, a rapid and accurate psychological quotient may be obtained, which is very convenient when large numbers of individuals are being tested.

Having described my invention, what I claim as new and desire to secure by Letters Patent, is:

1. A device of the character described, comprising rigidly connected spaced parallel structures, one having graduations therealong to denote increasing mental ages, the other having identical opposite graduations therealong furnishing a scale denoting intelligence quotients, and a third structure mounted slidably between said structures and having identical graduations therealong furnishing a scale denoting chronological ages and having an index at a determined average location thereon.

2. A device of the character described, comprising an elongated structure scaled with a series of progressively diminishing graduations to denote totals of psychologic tests at different increasing mental ages; another like structure parallel therewith having opposite identical diminishing graduations to denote a series of increasing intelligence quotients, and a third structure movable parallel to the others and having identical diminishing graduations therealong to denote a series of chronological ages and having a medial graduation thereon to serve as an index, to permit of deducing an intelligence quotient on the second-mentioned structure from a selected graduation on the first-mentioned structure, when said third structure is moved relative to the other structures to aline the graduation indicating the chronological age of the subject on said third structure with a graduation on the first structure indicating his selected mental age, to thus have the said index locate upon the second structure a place marking the approximate intelligence quotient of the subject.

Signed at Waterloo, Iowa, this 12th day of Sept. 1922.

THOMAS B. HOMAN.